United States Patent
Ethner et al.

(10) Patent No.: US 12,350,861 B2
(45) Date of Patent: Jul. 8, 2025

(54) DEVICE AND METHOD FOR LAMINATING A SUBSTRATE WITH A THERMOPLASTIC FILM

(71) Applicant: Henkel AG & Co. KGaA, Duesseldorf (DE)

(72) Inventors: Kai Ethner, Langenfeld (DE); Hans-Georg Kinzelmann, Pulheim (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 40 days.

(21) Appl. No.: 18/194,839

(22) Filed: Apr. 3, 2023

(65) Prior Publication Data

US 2023/0241807 A1    Aug. 3, 2023

Related U.S. Application Data

(63) Continuation of application No. PCT/EP2021/075766, filed on Sep. 20, 2021.

(30) Foreign Application Priority Data

Oct. 9, 2020  (EP) .................................. 20200967

(51) Int. Cl.
  *B29C 31/04*  (2006.01)
  *B29C 35/02*  (2006.01)
  (Continued)

(52) U.S. Cl.
  CPC .............. *B29C 31/04* (2013.01); *B29C 35/02* (2013.01); *B29C 35/16* (2013.01); *B29C 53/265* (2013.01);
  (Continued)

(58) Field of Classification Search
  CPC ......... B29C 31/04; B29C 35/02; B29C 35/16; B29C 53/265; B29C 2791/003; B29C 2033/385; B32B 41/00
  (Continued)

(56) References Cited

U.S. PATENT DOCUMENTS

| 5,141,583 A | 8/1992 | Held |
| 6,337,126 B1 | 1/2002 | Simpson et al. |

(Continued)

FOREIGN PATENT DOCUMENTS

| DE | 2741428 A1 | 4/1978 |
| DE | 3785338 T2 | 10/1993 |

(Continued)

OTHER PUBLICATIONS

Bei, W. et al., "English machine-translation by Clarivate Analytics of CN-210386443-U, with full foreign patent attached", B05D3/00, Jun. 2019. (Year: 2019).*

(Continued)

*Primary Examiner* — Abbas Rashid
*Assistant Examiner* — Gregory C. Grosso
(74) *Attorney, Agent, or Firm* — Sun Hee Lehmann

(57) ABSTRACT

A device for laminating a substrate with a thermoplastic film is described. The device includes a laminator for laminating the substrate with the thermoplastic film and a feeder for feeding the thermoplastic film to the laminator. The feeder includes a heater for heating a first side of the thermoplastic film, a cooler for cooling a second side of the thermoplastic film, and a collector for collecting condensate produced on the coolers.

20 Claims, 5 Drawing Sheets

(51) Int. Cl.
  *B29C 35/16* (2006.01)
  *B29C 53/26* (2006.01)
  *B29K 101/12* (2006.01)

(52) U.S. Cl.
  CPC .... *B29C 2791/003* (2013.01); *B29K 2101/12* (2013.01)

(58) Field of Classification Search
  USPC ....................................................... 264/259
  See application file for complete search history.

(56) References Cited

U.S. PATENT DOCUMENTS

| | | | |
|---|---|---|---|
| 10,350,855 B2 | 7/2019 | Kinzelmann et al. | |
| 2004/0103980 A1* | 6/2004 | Swiszcz | B31D 3/002 156/461 |
| 2017/0203543 A1* | 7/2017 | Kinzelmann | B32B 37/10 |
| 2020/0384751 A1 | 12/2020 | Gierlings et al. | |
| 2022/0063258 A1 | 3/2022 | Kinzelmann et al. | |

FOREIGN PATENT DOCUMENTS

| | | |
|---|---|---|
| DE | 202017006956 U1 | 2/2019 |
| DE | 202020102523 U1 | 7/2020 |
| EP | 0282562 B1 | 4/1993 |
| EP | 3183117 B1 | 3/2019 |
| EP | 3526042 B1 | 3/2019 |
| GB | 1581599 A | 12/1980 |

OTHER PUBLICATIONS

Inselmann, J., "English machine-translation by Clarivate Analytics of DE-3724011-C1, with full foreign patent attached", B29C43/48, Jul. 1987. (Year: 1987).*

Bei, W. et al., "English machine-translation by Clarivate Analytics of CN-210386443-U, with full foreign patent attached", B05D3/00, Jun. 2019. (See NPL Filed on Sep. 25, 2024.) (Year: 2019).*

Inselmann, J., "English machine-translation by Clarivate Analytics of DE-3724011-C1, with full foreign patent attached", B29C43/48, Jul. 1987. (See NPL Filed on Sep. 25, 2024.) (Year: 1987).*

Tension Control Complete Guide, Tension Controller Electromagnetic Clutches and Brakes, Dec. 31, 2019, https://dl.mitsubishielectric.co.jp/dl/fa/document/catalog/clutch/sh-170011eng/sh170011-c.pdf.

International Search Report for International PCT Patent Application No. PCT/EP2021/075763 dated Dec. 22, 2021.

International Search Report for International PCT Patent Application No. PCT/EP2021/075766 dated Dec. 22, 2021.

* cited by examiner

DEVICE AND METHOD FOR LAMINATING A SUBSTRATE WITH A THERMOPLASTIC FILM

DESCRIPTION

The present invention relates to a method and a device for continuously laminating a substrate with a thermoplastic coating material, in particular a film. The substrate can also be a film. However, it can also be a solid body made of plastic, metal or another material.

Various methods for laminating substrates with a thermoplastic film are known. EP 3 183 117 B1 describes a method and a device for bonding two film-like substrates, wherein at least one film is guided on a conveyor belt past a cooling and heating device in such a way that one side of the film is cooled but the other is heated.

EP 3 526 042 B1 discloses a similar method in which, in contrast, one film is guided on a cooled roller and is subsequently connected to the second film also on this roller.

As has been found, quality degradation often occurs in the surface of the film, causing problems during lamination.

It is therefore an object of the present invention to specify a device and a method for laminating a substrate with a thermoplastic film which do not have the disadvantages mentioned.

This object is achieved by the subject matter of the independent claims. Advantageous embodiments and developments are the subject matter of the dependent claims.

According to one aspect of the invention, a device for laminating a substrate with a thermoplastic film is specified, wherein the device has a laminating unit for laminating the substrate with the thermoplastic film, and a feed device for feeding the thermoplastic film to the laminating unit. The feed device for the thermoplastic film has devices for heating a first side of the film and devices for cooling a second side of the film. Furthermore, it has a device for collecting condensate produced on the cooling devices.

A laminating unit is understood here and below to mean a device that performs the coating, in particular by means of pressure, of the substrate with the thermoplastic film. For this purpose, rollers are typically provided by which the two films are guided if the substrate is designed as a film. If the substrate is not designed as a film, the laminating unit often also comprises at least one roller by means of which the thermoplastic film is applied to the substrate.

The device has the advantage that condensate forming on the cooling devices is collected and optionally discharged and does not come into contact with the surface of the film. This means that damage to the film surface caused by condensate can be avoided.

The film surface can be damaged if condensate comes into direct contact with the film. This is the case, for example, if the second side of the film is in contact with a cooling element, for example a cooled conveyor belt or a cooled roller. In addition, damage to the film or plant components can occur if condensate drips down onto them. Removing the condensate prevents this.

A further way to prevent condensate from coming into contact with the film is to guide the film at a distance from the cooling devices. This means, in particular, that the film is not in direct contact with cooled surfaces. In this case, collection and removal of condensate are not required in every case, but can nevertheless be provided, for example in order to prevent condensate from dripping down onto the heating devices or other plant components.

Both options for preventing contact between film and condensate can also be combined.

The device for laminating the substrate with a thermoplastic film can also have a feed device for the substrate, the design of which depends on the type of substrate. In particular, infrared emitters can be provided as devices for heating the film, but other heat sources such as lasers may also be provided. For cooling, cooled metal sheets may be provided, for example.

The device for collecting condensate produced on the cooling devices can, in particular, be designed in the form of a trough. The arrangement of the device for collecting condensate produced on the cooling devices takes into account where the condensate drips. In particular, the device for collecting condensate is arranged in such a way that no condensate can get onto the film or sensitive plant components.

The device for collecting can also have several individual elements, for example several trough-like devices. These can also be supplemented by devices that remove the condensate from the cool surfaces, for example scrapers that scrape along the surfaces, remove the condensate and feed it to the trough.

According to one embodiment, the device for collecting condensate thus comprises at least one device for scraping condensate from surfaces of the cooling devices. In this embodiment, surfaces on which condensate forms can be brought into contact with the film after removal of this condensate without any risk of damage to the film.

According to one embodiment, the cooling devices are arranged below or next to the heating devices. This already structurally prevents condensate from dripping down onto the heating devices.

The device can also have a number of controllably driven rollers over which the film is guided past the heating devices and the cooling devices, wherein a tension of the film can be regulated by the speed of the driven rollers.

This embodiment has the advantage that it enables the thermoplastic film to be guided in a practically contactless manner by means of the controllably driven rollers. Accordingly, in the feed device, the film does not lie flat on a conveyor belt or a roller with a large diameter or another surface but is only supported and conveyed at specific points by the controllably driven rollers and is optionally deflected and otherwise guided in a contactless manner. Since the rotational speed of the driven rollers can be controlled, in particular even regulated, tensions within the film can be equalized by building up speed differences between individual rollers. If, for example, the guided film loses tension, a speed difference between two rollers can be set in such a way that the film is tensioned again. This is particularly advantageous because heating the thermoplastic film causes both expansion and softening of the film.

In addition, the practically contactless guiding of the film has the advantage that said film can be heated or cooled particularly efficiently.

According to one embodiment, driven rollers are arranged in the direction of movement of the film in the conveying direction of the film at least upstream and/or downstream of the cooling and heating devices, i.e., they guide the film immediately before it passes through the heating and cooling devices. This embodiment has the advantage that changes in the length of the thermoplastic film caused by heating or cooling the film can be compensated for by regulating the speed of the rollers.

According to an alternative embodiment, the film is guided at least in sections by means of a conveyor belt on which it rests.

The thermoplastic film is guided in particular at a distance from the heating devices. Thus, the thermoplastic film does not come into contact with elements of the heating devices.

The cooling devices can comprise at least one cooled roller over which the film is guided. Alternatively, the thermoplastic film can be guided at a distance from the cooling devices. In the latter case, the cooling devices are arranged along the film web tensioned between the rollers in the feed device, although not on the same side of the film as the heating devices, but on the opposite side.

If the thermoplastic film is guided at a distance from the cooling devices, this has the advantage that the film does not come into contact with surfaces on which condensate forms.

According to one embodiment, between the heating devices and the thermoplastic film, grids are arranged for protecting the heating devices from any contact with the film. Such grids have the advantage that they prevent contact between the thermoplastic film and the heating devices. As an additional safeguard, the feed device can have at least one device for generating an air flow between the thermoplastic film and the heating devices.

The device for generating an air flow can be designed as a blower, compressed air source or also as a vacuum source. It has the advantage that if the web tension of the film is too low or if the web tears, the film is prevented from sticking to the grid or to the heating device. For this purpose, it can be provided that the device for generating an air flow is automatically and/or manually switched on when the web tension is lost. In this case, it can blow cold air between the heating device and the film or the grid, for example. If a grid is provided, the air escapes through the grid and blows the film away from the heating devices.

There are various options for the arrangement of the driven rollers and optionally further rollers or deflecting rollers or the conveyor belt of the feed device. For example, the thermoplastic film can be guided in the feed device vertically upward and/or downward at least in sections. However, it can also be guided obliquely upward and/or downward at least in sections. In addition, the thermoplastic film can be guided at least in sections on a circular arc. Which arrangement is chosen can depend, among other things, on the space available and other practical considerations.

According to one embodiment, the feed device has an alternative feed path for the film that does not comprise any heating devices or any cooling devices. On this alternative feed path, the film is thus fed to the laminating unit without being heated. The alternative feed path can be used, for example, if a thermoplastic film is not used for lamination but another material, or if the connection between the film and the substrate is made in a different way, for example by means of a separately applied adhesive. In particular, if different methods are to be used simultaneously or alternately at one plant, the presence of the alternative feed path is advantageous.

According to a further aspect of the invention, a method for laminating a substrate with a thermoplastic film is specified, wherein the method comprises feeding the film to a laminating unit, wherein, during the feeding, the film is heated on a first side and cooled on a second side, wherein a condensate forming on cooling devices is collected and optionally discharged, such that it does not come into contact with the film.

As an alternative to collecting and optionally discharging the condensate, it can be provided that the film is guided at a distance from the cooling devices and thus does not come into direct contact with cooled surfaces.

According to one embodiment, the feeding is carried out by means of a number of controllably driven rollers over which the film is guided, wherein, during the feeding, a tension of the film is controlled and in particular also regulated by the speed of the driven rollers.

In particular, sectional regulation of the speed in the feed device can be provided, which is made possible by the fact that the driven rollers can be regulated individually. If the rollers can be regulated in terms of speed independently of one another, it is possible to set differential speeds between successive rollers, by means of which tension in the film can be built up or relieved.

The substrate, which can be present in the form of a film or in another form, is also fed to the lamination unit.

According to one embodiment, the film is held at a distance from the heating devices by an air flow blown into an intermediate space between the film and the heating devices. For this purpose, it can be provided in particular that air blown into the intermediate space exits through openings in a grid and blows the film away from the heating devices.

Embodiments of the invention are explained in more detail below with reference to schematic figures.

BRIEF DESCRIPTION OF THE DRAWINGS

FIG. 1 shows a device 1 for laminating a substrate with a thermoplastic film. In FIG. 1, the thermoplastic film is denoted by the reference sign 11, the substrate by the reference sign 12 and the already laminated substrate by the reference sign 13.

Figure 1:
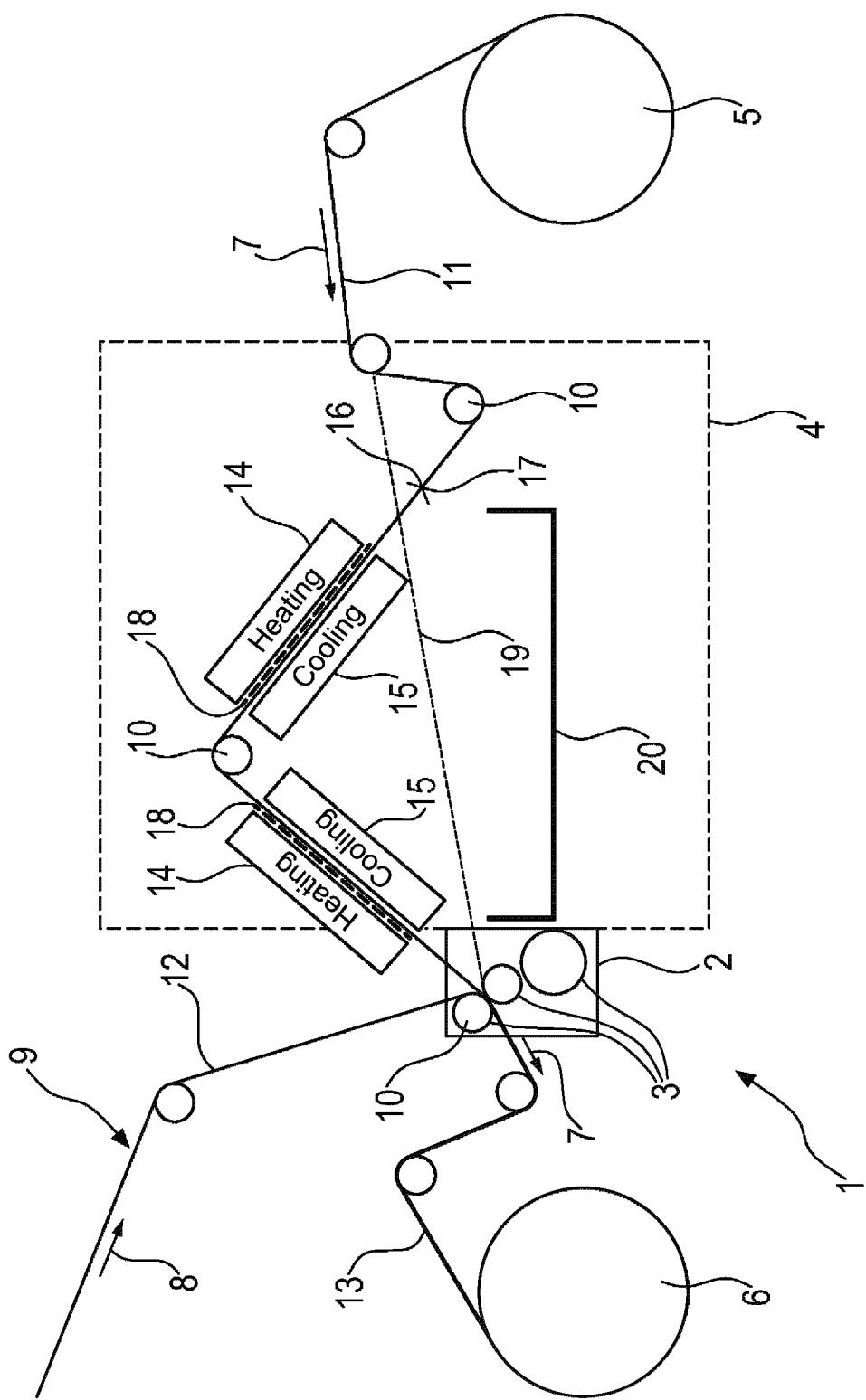
FIG. 1 schematically shows a device for laminating a substrate with a thermoplastic film according to a first embodiment of the invention.

The device 1 comprises a laminating unit 2, which in particular has a number of rollers 3 for pressing the film 11 onto the substrate 12. Furthermore, the device 1 comprises a feed device 4 for feeding the thermoplastic film 11 to the laminating unit 2. The film 11 is unwound from an unwinder 5 and transported by means of the feed device 4 to the laminating unit 2, after which the coated substrate 13 is rolled up by the rewinder 6.

The feed device 4 has a number of controllably driven rollers 10. In the embodiment shown, three driven rollers 10 are illustrated. However, this illustration is only exemplary and more or fewer driven rollers can also be provided.

The feed device 4 comprises further rollers or rolls which serve to guide and deflect the film 11 and are only shown by way of example and are not described in more detail. The thermoplastic film 11 is transported by means of the driven rollers 10 in the direction of the arrow 7 to the laminating unit 2. In the embodiment shown, the substrate 12 is transported along the arrow 8 to the laminating unit 2 also by means of a suitable feed device 9. After lamination, the laminated substrate 13 is transported along the arrow 7 to the rewinder 6.

The film 11 is largely guided in a contactless manner. Only in the area of the rollers 10 is the film 11 guided or supported at specific points. The film 11 is not supported between the rollers 10. It thus has a tension caused, in particular, by the gravity acting on it and by the rotational speeds of the rollers 10.

Along its path through the feed device 4, the thermoplastic film 11 is guided between the rollers 10 past devices 14 for heating a first side 16 of the film 11 and devices 15 for cooling a second side 17 of the film 11. The heating devices 14 and the cooling devices 15 are also shown here merely by way of example. The number and arrangement of the heating devices 14 and the cooling devices 15 can vary.

Heating the first side 16 causes softening to partial melting of the thermoplastic film 11 on its first side 16, such that said film can bond to the substrate 12 in the laminating unit 2. Cooling the second side 17 serves to prevent the film 11 from melting completely and to maintain a certain stability, which is necessary for the transport process to the laminating unit 2. Thus, the cooling partially compensates for the heat introduced. In particular, it can compensate for the waste heat if the heating devices are designed as infrared emitters.

The film 11 is guided at a distance from the heating devices 14 and the cooling devices 15 and thus does not come into direct contact with cooled surfaces. Between the heating devices 14 and the film 11, grids 18 are arranged which are intended to prevent the film 11 from adhering to the heating devices 14.

The feed device 4 has an alternative feed path for a film to the laminating unit 2, which is indicated in FIG. 1 by a dashed line 19 and which is not guided past the heating devices 14 and cooling devices 15. The alternative path can be used for a film which does not consist of a thermoplastic material or which is not to be heated or cooled for other reasons.

The device 1 further comprises a trough 20 for collecting condensate which is formed on the cooling devices 15 due to the moist ambient air. The trough 20 is arranged below the cooling devices 15, such that condensate flows off the cooling devices 15 by virtue of gravity and drips into the trough 20. On this path, the condensate does not pass through any further elements of the feed device 4, in particular not the heating devices 14 or the film web, which could be damaged by the condensate. The trough 20 is thus positioned in such a way that condensate forming on the devices 15 can drip directly into the trough 20. Discharging the condensate ensures that no condensate comes into contact with the film 11, which could reduce the quality of the surface.

Figure 2:
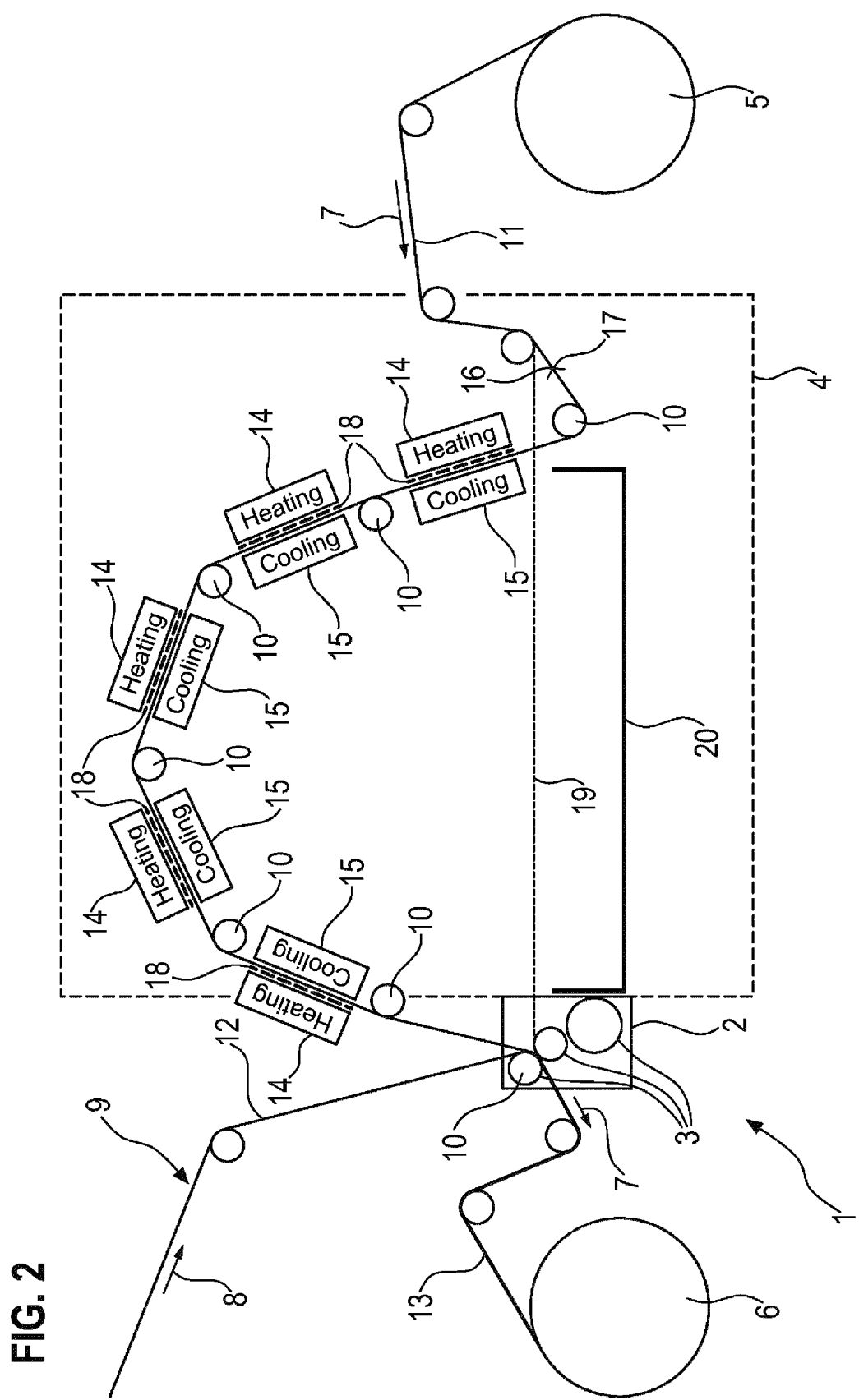
FIG. 2 schematically shows a device for laminating a substrate with a thermoplastic film according to a second embodiment of the invention.

FIG. 2 shows a second embodiment of a device 1 for laminating a substrate with a thermoplastic film. This device 1 differs from the embodiment shown in FIG. 1 in that several driven rollers 10 are provided which guide the film 11 on a semi-circular web.

Figure 3:
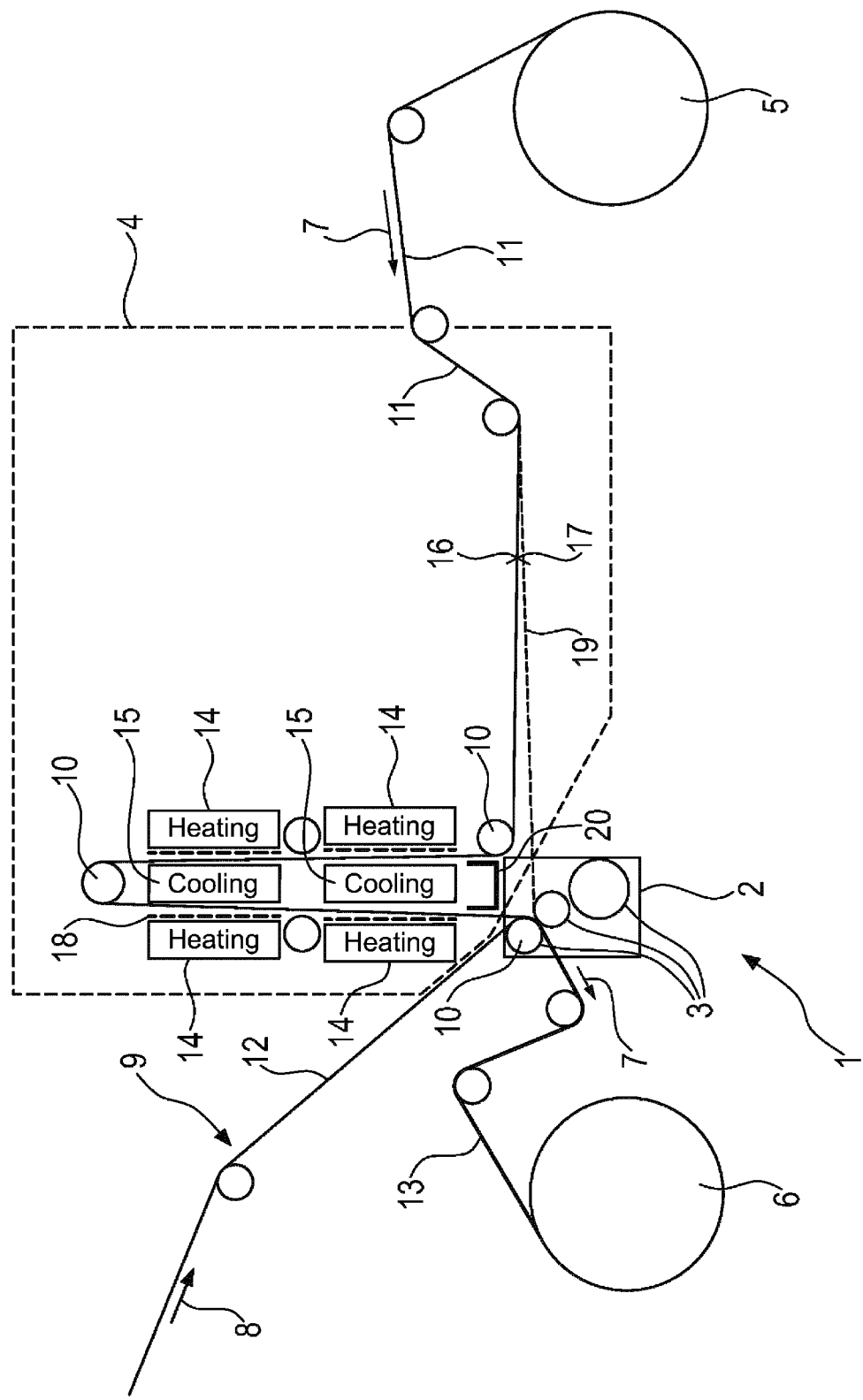
FIG. 3 schematically shows a device for laminating a substrate with a thermoplastic film according to a third embodiment of the invention.

FIG. 3 shows a third embodiment of the device 1 for laminating a substrate with a thermoplastic film 11. This embodiment differs from those previously shown in that several driven rollers 10 are arranged one above the other such that the film 11 is guided vertically in sections. In the embodiment shown, two heating devices 14 and two cooling devices 15 are also arranged one above the other in each case.

This arrangement is particularly space-saving and can also be implemented in a small installation space. The cooling devices 15 are arranged one above the other in this embodiment, but not above heating devices 14, so that no condensate can drip onto the heating devices 14. A trough 20 for collecting condensate is again provided immediately below the lower cooling device 15.

Figure 4:
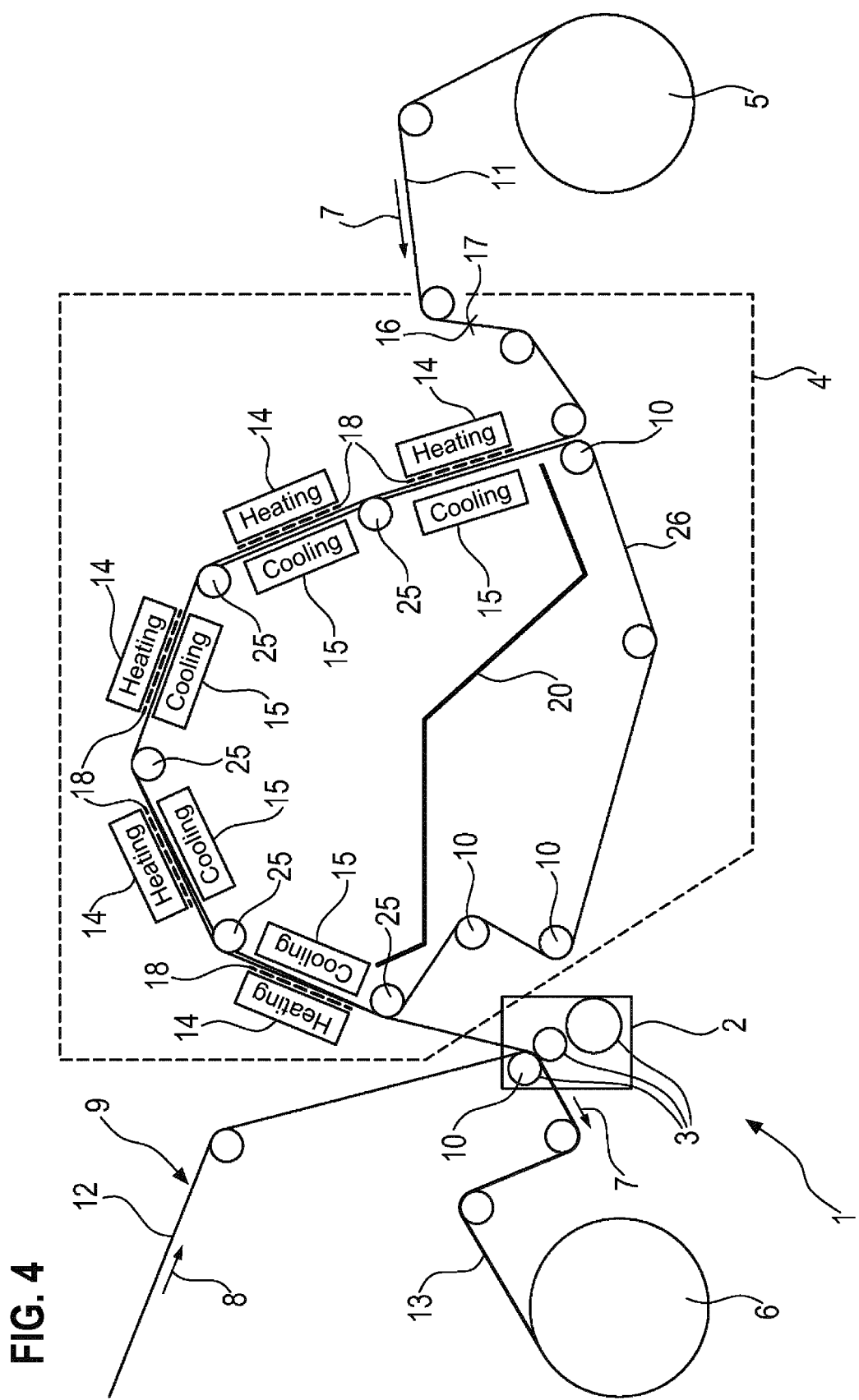
FIG. 4 schematically shows a device for laminating a substrate with a thermoplastic film according to a fourth embodiment of the invention, and FIG. 5 schematically shows a device for laminating a substrate with a thermoplastic film according to a fifth embodiment of the invention.

FIG. 4 shows a fourth embodiment of the device 1 for laminating a substrate 12 with a thermoplastic film 11. This embodiment differs from those previously shown in that the film 11 is guided in the feed device 4 on a conveyor belt 26 by means of non-driven rollers 25. The conveyor belt 26 is guided at a distance from the cooling devices 15. The trough 20 for collecting the condensate is arranged between the cooling devices 15 and further elements of the feed device 4 in such a way that the condensate drips directly into the trough 20 and does not come into contact with further elements.

Figure 5:
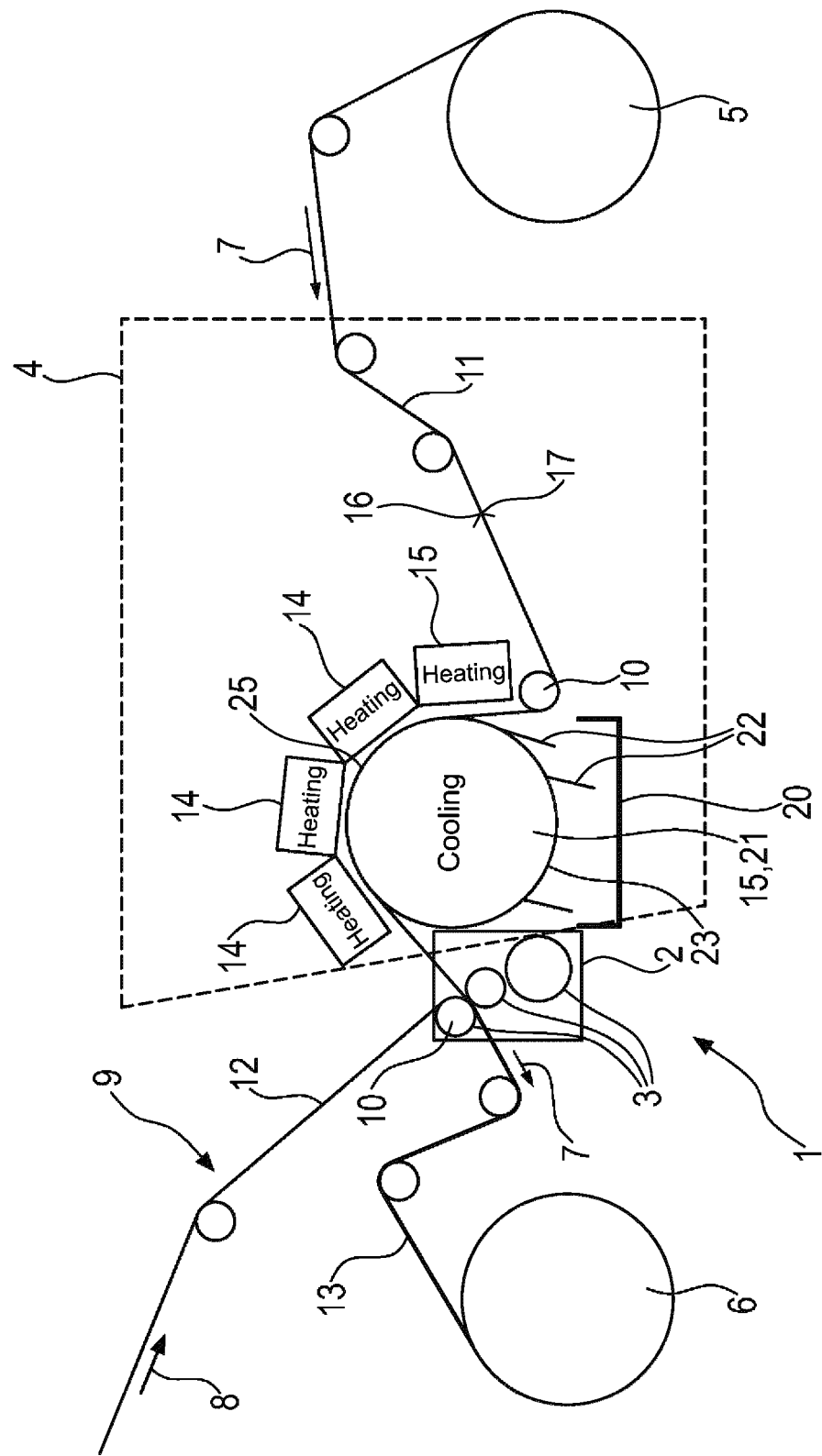

FIG. 5 shows a fifth embodiment of the device 1 for laminating a substrate 12 with a thermoplastic film 11. This embodiment differs from those previously shown in that the film 11 is partially guided in the feed device 4 not in a contactless manner, but by means of a cooled roller 21. The second side 17 of the film 11 thus rests, in places, on the surface of the cooled roller 21. The cooled roller 21 can also be driven at a controllable speed.

In this embodiment, scrapers 22 are provided which scrape condensate produced on the cooled roller 21 from the roller 21 and let it drip into the trough 20. In this case, the scrapers 22 are arranged in the area of an underside 23 of the roller 21, while the film 11 is guided on the upper side 24 of the roller 21. In this way, the film 11 is prevented from coming into contact with condensate on the surface of the roller 21, which could reduce the quality of the film surface.

The driven roller 10 just before the cooled roller 21 enables the web tension of the film 11 to be regulated, for example in response to a decrease in tension due to the heating of the film 11.

LIST OF REFERENCE SIGNS

1 Device
2 Laminating unit
3 Roller
4 Feed device
5 Unwinder
6 Rewinder
7 Arrow
8 Arrow
9 Feed device
10 Roller
11 Film
12 Substrate
13 Laminated substrate
14 Heating device
15 Cooling device
16 First side
17 Second side
18 Grid
19 Dashed line
20 Trough
21 Roller
22 Scraper
23 Lower side 24 Upper side
25 Roller
26 Conveyor belt

The invention claimed is:

1. A device for laminating a substrate with a thermoplastic film, the device comprising:
 a laminator configured to laminate the substrate with the thermoplastic film; and
 a feeder configured to feed the thermoplastic film to the laminator, the feeder comprising:
  a heater arranged adjacent to and configured to heat a first side of the thermoplastic film,
  a cooler arranged adjacent to and configured to cool a second side of the thermoplastic film, the second side of the thermoplastic film being opposite the first side of the thermoplastic film, and the cooler opposing the heater along a direction of movement of the thermoplastic film, and a
  collector spaced entirely from and under the cooler, the collector configured to collect condensate produced on the cooler.

2. The device of claim 1, wherein the cooler comprises at least one cooled roller over which the thermoplastic film is guided.

3. The device of claim 1, wherein the thermoplastic film is guided at a distance from the cooler.

4. The device of claim 1, wherein the collector comprises at least one scraper configured to scrape condensate from at least one surface of the cooler.

5. The device of claim 1, further comprising a plurality of rollers over which the thermoplastic film is guided past the heater and the cooler.

6. The device of claim 1, further comprising a conveyor belt on which the thermoplastic film is guided.

7. The device of claim 1, wherein the feeder further comprises a grid arranged between the heater and the thermoplastic film to protect the heater from contact with the thermoplastic film.

8. The device of claim 1, wherein the feeder comprises a blower, a compressed air source, or a vacuum source configured to generate air flow between the thermoplastic film and the heater.

9. The device of claim 1, wherein the thermoplastic film is at least partially guided in the feeder along a vertical direction, along an oblique direction, and/or along a circular arc.

10. The device of claim 1, wherein the feeder has an alternative feed path for another thermoplastic film, the alternative feed path not including any heater or any cooler.

11. The device of claim 1, wherein the cooler overlaps with the heater along the direction of movement of the thermoplastic film.

12. The device of claim 5, wherein the plurality of rollers are each driven such that the rotational speed of each of the plurality of rollers is regulated.

13. The device of claim 12, wherein a tension of the thermoplastic film is regulated by the rotational speed of each of the plurality of rollers.

14. A device for laminating a substrate with a thermoplastic film, the device comprising:
 a laminator configured to laminate the substrate with the thermoplastic film; and
 a feeder configured to feed the thermoplastic film to the laminator, the feeder comprising:
  a heater configured to heat a first side of the thermoplastic film,
  a grid arranged between the heater and the thermoplastic film, and
  a cooler configured to cool a second side of the thermoplastic film, the second side of the thermoplastic film being opposite the first side of the thermoplastic film,
 wherein the thermoplastic film is guided at a distance from the heater and the cooler.

15. The device of claim 14, wherein the cooler opposes the heater along a direction of movement of the thermoplastic film.

16. The device of claim 15, wherein the cooler overlaps with the heater along the direction of movement of the thermoplastic film.

17. A method for laminating a substrate with a thermoplastic film, the method comprising:
 guiding the thermoplastic film through a feeder in a feed direction;
 heating a first side of the thermoplastic film using a heater;
 cooling a second side of the thermoplastic film opposing the first side of the thermoplastic film using a cooler simultaneously with heating the first side of the thermoplastic film using the heater;
 collecting condensate formed on the cooler using a collector spaced entirely from and under the cooler; and
 feeding the heated and cooled thermoplastic film to a laminator.

18. The method of claim 17, wherein the thermoplastic film is guided at a distance from the cooler.

19. The method of claim 17, wherein the thermoplastic film is guided using a plurality of rollers.

20. The method of claim 18, further comprising blowing air into an intermediate space between the thermoplastic film and the heater.

* * * * *